March 16, 1943.  P. O. LANGGUTH ET AL  2,313,950

POTENTIAL DEVICE

Filed April 4, 1942  2 Sheets-Sheet 1

Magnetic Shunt  Magnetic Shunt

WITNESSES:  
Edward Michaels

INVENTORS  
Paul O. Langguth and  
Samuel A. Bottonari.  
BY  
Franklin E. Hardy  
ATTORNEY INVENTORS
Paul O. Langguth and
Samuel A. Bottonari.
BY Franklin E. Hardy
ATTORNEY Patented Mar. 16, 1943

2,313,950

UNITED STATES PATENT OFFICE 2,313,950

POTENTIAL DEVICE

Paul O. Langguth and Samuel A. Bottonari, Wilkinsburg, Pa., assignors to Westinghouse Electric & Manufacturing Company, East Pittsburgh, Pa., a corporation of Pennsylvania Application April 4, 1942, Serial No. 437,670

4 Claims. (Cl. 171—119)

The invention relates to capacitor type potential devices for use for supplying electromotive force from high voltage sources to such devices as synchroscopes, measuring instruments, relays, and the like. The capacitance means employed may be a condenser bushing or a coupling capacitor used as a capacitance potentiometer. Such devices are used to apply a voltage to electro-responsive devices that are proportional to and substantially in phase with the voltage of the source. Such a potential device is illustrated and described in application Serial No. 348,774 of P. O. Langguth and E. L. Harder for Potential devices, filed July 31, 1940, and assigned to the same assignee as this application.

In recent types of such potential devices, it has been customary to employ a main transformer which is a high reactance potential transformer so constructed as to provide for controllably varying the leakage reactance so that the potential transformer may be tuned to resonate with the capacity of the capacitor stack or condenser bushing for a desired condition of operation. The adjustable reactance transformer may be of a type in which the primary and secondary windings are wound about one winding leg of the transformer and magnetic shunts are provided between the primary and secondary within the windows in the core structure, and tertiary windings are wound about the magnetic shunts and connected in circuit with one of the transformer windings. The tertiary windings positioned about the magnetic shunts are provided with a large number of tap connections so as to vary the number of turns of the tertiary windings in circuit with the transformer and thereby vary the leakage reactance thereof. Such an adjustable reactance transformer is illustrated and described in Patent No. 2,276,032 of Jesse B. Gibbs for Adjustable reactance transformers, issued March 10, 1942, and assigned to the same assignee as this application.

Such potential devices, including the potential transformer and necessary auxiliary transformers and connections for making adjustments, are self contained, the adjustments being made at the housing enclosing the apparatus. The output circuit is then led to the desired location for operating the instruments to be supplied therefrom, which may be within a station some distance away from the potential device itself. If a remotely controlled device is required, that is, a device arranged so that the adjustments may be made at the instrument supplied therefrom instead of at the potential device housing, this might be accomplished by providing a multi-conductor cable carrying a considerable number of separate conductors corresponding to the number of tap connections provided on the tertiary windings of the potential transformer, together with the main circuit conductors from the potential device housing to the place at which the adjustments are to be made. This is necessary because the reactance shunts are a part of the potential transformer which must be located at the voltage source associated with the potential device. The requirements for the relatively high insulation necessary for the conductors of such a cable would render it impractical and costly in construction.

It is an object of the present invention to provide a potential device of the above-indicated character so organized and arranged that the adjustments of the device may be made at a point near the instrument being supplied and in which a minimum number of conductors, such as three or four only, are required between the potential transformer and the remotely connected adjusting unit panel.

Other objects and advantages of the invention will be apparent from the following description of preferred embodiments thereof, reference being had to the accompanying drawings, in which.

Figure 1:
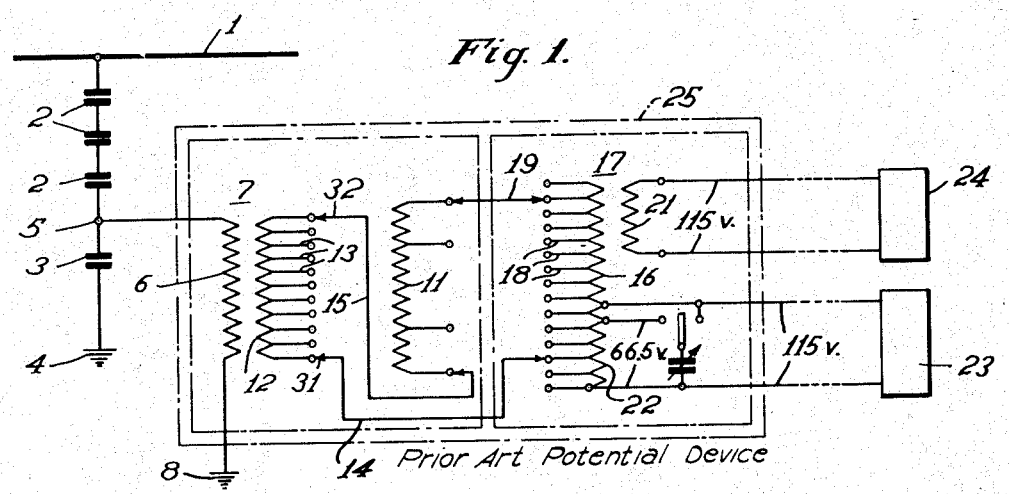
Figure 1 is a diagrammatic view of apparatus and circuits illustrating a prior art capacitance type potential device.

Referring to Figure 1, a conductor 1 represents one of the conductors of an alternating-current polyphase high-voltage system. A coupling capacitor or capacitance potentiometer comprising a plurality of condensers 2 and a condenser 3 is connected between the conductor 1 and ground at 4. The upper section comprising the condensers 2 comprises the "stack" and the lower section 3 the "tap" condenser. A tap 5 between these two sections provides one terminal for the primary winding 6 of a main or potential transformer 7, the other end being connected to ground at 8. The main or potential transformer includes also a secondary winding 11 and one or more tertiary windings 12, the tertiary windings being provided with a considerable number of tap connections 13 for varying the number of turns between the conductors 14 and 15 included in a circuit comprising the tertiary winding 12, the secondary winding 11, and the primary winding 16 of an auxiliary transformer 17. The winding 16 is also provided with a number of tap connections 18 which may be selectively connected to the terminals of conductors 19 and 14 for including the desired number of turns of winding 16 in the circuit included therebetween. The auxiliary transformer 17 is also provided with one or more secondary windings such as the winding 21 that is inductively related to the winding 16, and a tapped portion 22 of the winding 16 which may be provided to establish sources of selective voltages for an instrument or load device 23. The instruments or load devices 23 and 24 are connected to the auxiliary transformer 17 as shown and may be located at a place remote from the potential device unit which includes the main transformer 7 and the auxiliary transformer 17 within the housing 25.

Figures 2, 3:
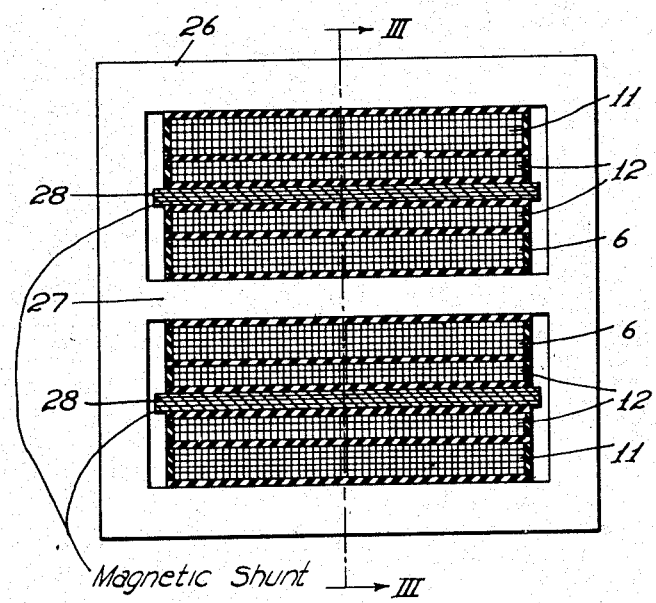
Fig. 2 is a view partly in section of a variable reactance transformer that may be employed in the circuit of Fig. 1.
Fig. 3 is a sectional view along the line III—III in Fig. 2.

One construction of potential transformer is shown in Figs. 2 and 3 in which a core 26 is provided having a winding leg 27 about which the primary winding 6 and the secondary winding 11 are wound with sufficient space between them to provide room for the magnetic shunts 28 about which are wound the tertiary windings 12 for varying the flux density in the magnetic shunts and thereby, the leakage reactance of the transformer. In the type of device shown in Fig. 1, the adjustments of the reactance of the potential transformer is effected by adjusting the contacts between terminals 31 and 32 of conductors 14 and 15, respectively, with the selected tap conductors 13 of the tertiary winding 12.

Figure 4:
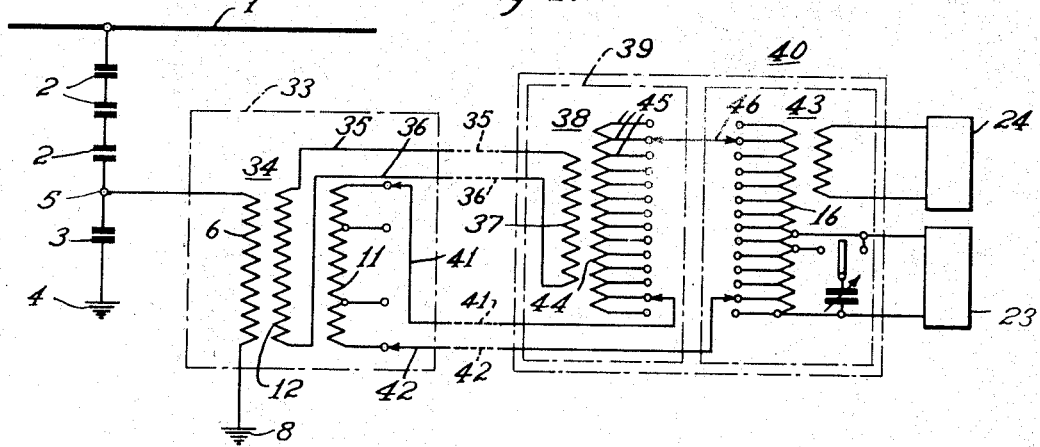
Fig. 4 is a diagrammatic view of apparatus and circuits arranged in accordance with one embodiment of the invention.

Referring to Fig. 4, a coupling capacitor comprising condensers 2 and 3 is connected between the high voltage conductor 1 and ground, the same as in Fig. 1, and the main or potential transformer associated with the device is positioned within a housing 33 adjacent the capacitor stack. This potential transformer 34 includes a primary winding 6 connected between the tapped point 5 of the capacitance potentiometer and ground at 8, a secondary winding 11 and a tertiary winding 12, the same as the potential transformer 7 in Fig. 1. However, in Fig. 4, no tap connections are provided on the tertiary winding 12 as is the case in Fig. 1, but the terminals of the winding 12 are connected by conductors 35 and 36 to a secondary winding 37 of a reactance compensating transformer 38 shown within a housing 39 of an adjusting unit 40 located adjacent the load devices or instruments 23 and 24. The terminals of the secondary winding 11 are connected by conductors 41 and 42 in a circuit including the primary winding 16 of an auxiliary transformer 43 which is similar in construction to the transformer 17 shown in Fig. 1. This circuit includes also a primary winding 44 of the reactance transformer 38 which is inductively related to the winding 37. The primary winding 44 is provided with a plurality of tap connections 45 for varying the number of turns of the winding 44 included between the terminals of conductors 41 and 46. By this arrangement of the apparatus and circuits, the adjusting unit 40 may be placed adjacent to the load devices 23 and 24 with the requirement only for four conductors 35, 36, 41 and 42 between the adjusting unit 40 and the potential transformer 34. This includes only two conductors for the tertiary winding 12 and two conductors for the secondary winding 11 of the main transformer. The effect of the tertiary winding 12 on the magnetic shunts of the main transformer is controlled by varying the connections to the tap conductors 45 of the reactance compensating transformer in the adjusting unit, rather than by varying the number of turns of the tertiary winding in circuit with the secondary winding as in the apparatus shown in Fig. 1.

Figure 5:
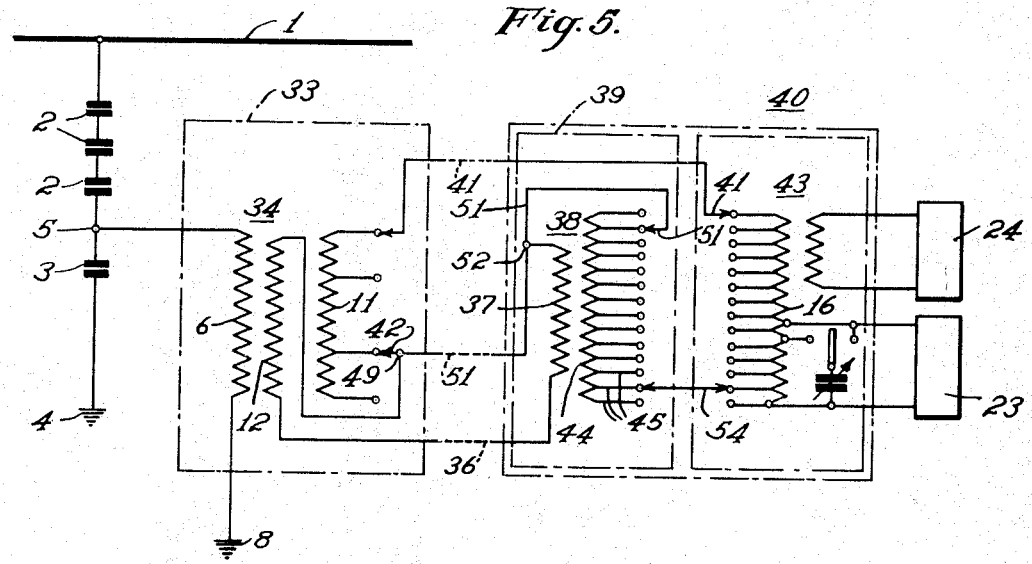
Fig. 5 is a diagrammatic view of apparatus and circuits showing a modification of the arrangements of Fig. 4.

Referring to Fig. 5, the arrangement is in general similar to that shown in Fig. 4 except that the number of conductors between the potential transformer 34 and the adjusting unit 40 have been reduced to three. The conductor 36 connects the corresponding ends of the windings 12 and 37 as in Fig. 4, the conductor 35 from the winding 12 connects at a junction point 49 with the conductor 42 from the winding 11, so that the two conductors unite in a common conductor 51 between junction point 49 and 52 which is connected to one end of windings 37 and 44. In Fig. 5, the conductor 41 from the upper end of the winding 11 is shown as connected to the upper end of the winding 16 of the auxiliary transformer 43 and the two windings 16 and 44 are connected together at their lower ends through conductor 54. The three windings 11, 44 and 16 are connected in circuit as in Fig. 4 and the two windings 12 and 37 are also connected in circuit as in Fig. 4.

Figure 6:
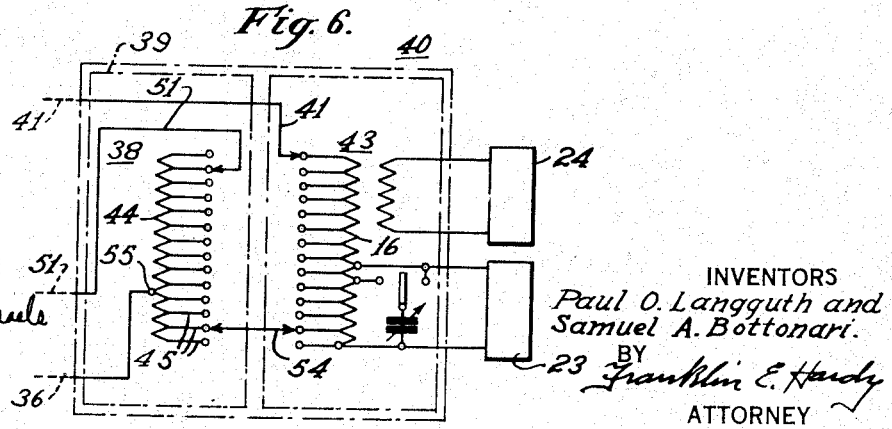
Fig. 6 is a diagrammatic view of a modification of a part of Fig. 5.

The modification shown in Fig. 6 is similar to that shown in Fig. 5 except that the transformer 38 is an autotransformer, the winding 37 shown in Fig. 5 being omitted in Fig. 6 and the conductor 36 being connected directly to junction point 55 on the winding 44. As in Fig. 5 the winding 11 of the main transformer is connected to conductors 41 and 51 and the winding 12 is connected to conductors 51 and 36.

It will be apparent to one skilled in the art that modifications may be made in the apparatus and circuits described within the spirit of our invention, and we do not wish to be limited otherwise than by the scope of the appended claims.

We claim as our invention:

1. In combination, a source of alternating electromotive force, a plurality of condensers connected in series across said source, a main transformer having a primary winding connected across a portion of said condensers and a secondary winding, a magnetic shunt between the primary and secondary windings of the main transformer providing a path for leakage flux, a tertiary winding about the magnetic shunt and means for selectively adjusting the quantity relationship of the leakage flux comprising a compensating transformer having a winding connected in series with the tertiary winding of the main transformer and a winding in series with the secondary winding of the main transformer, said last named winding being provided with a plurality of tap connections for varying the number of winding turns in series with the main transformer secondary winding.

2. In combination, a source of alternating electromotive force, a plurality of condensers connected to said source, a main transformer having a primary winding connected to said condensers and a secondary winding connected to supply a voltage responsive load, and means for selectively adjusting the leakage reactance of said main transformer to provide the necessary tuning reactance for maintaining the desired voltage ratio and phase difference between the voltage on the primary and on the secondary of the transformer comprising a magnetic shunt on the main transformer and a tertiary winding thereon, a compensating transformer having a pair of inductively related windings, one of said windings being provided with a plurality of tap connections for including a selected number of turns in series with the main transformer secondary winding, the other winding of the compensating transformer being connected in series with the tertiary winding of the main transformer.

3. In combination, a source of alternating electromotive force, a potential device and an adjusting transformer unit remote from the potential device for supplying a voltage responsive load, said potential device comprising a capacitance potentiometer connected across said source and a main transformer having a primary winding connected across a portion of said potentiometer and a secondary winding, and means for selectively adjusting the leakage reactance of said main transformer comprising a magnetic shunt on the main transformer, a tertiary winding thereon and an adjusting transformer unit including a compensating transformer having a primary winding and a secondary winding, said primary winding of said compensating transformer in series with the main transformer secondary winding and being provided with a plurality of tap connections for including a selected number of turns of said primary winding in said circuit, said secondary winding of said compensating transformer being connected in series with the tertiary winding of the main transformer.

4. In combination, a source of alternating electromotive force, a potential device and an adjusting transformer unit remote from the potential device for supplying a voltage responsive load, said potential device comprising a capacitance potentiometer connected across said source and a main transformer having a primary winding connected across a portion of said potentiometer and a secondary winding, and means for selectively adjusting the leakage reactance of said main transformer comprising a magnetic shunt on the main transformer, a tertiary winding thereon, and an adjusting transformer unit including a compensating transformer and an auxiliary transformer, said compensating transformer having a primary winding and a secondary winding, the auxiliary transformer having a winding through which energy is supplied to a load connected in series with the primary winding of the compensating transformer and the secondary winding of the main transformer, the secondary winding of the compensating transformer being connected in series with the tertiary winding of the main transformer, and a plurality of tap changing connections for adjusting the number of turns of the compensating transformer primary winding in circuit for adjusting the leakage reactance of the main transformer.

PAUL O. LANGGUTH.
SAMUEL A. BOTTONARI.